UNITED STATES PATENT OFFICE.

WILLIAM O. STODDARD, JR., OF MADISON, NEW JERSEY, ASSIGNOR, BY MESNE ASSIGNMENTS, TO THE DURATEX COMPANY, OF NEWARK, NEW JERSEY, A CORPORATION OF NEW JERSEY.

MATERIAL ADAPTED FOR USE IN THE MANUFACTURE OF AN IMITATION LEATHER.

1,190,806. Specification of Letters Patent. Patented July 11, 1916.

No Drawing. Application filed December 29, 1914. Serial No. 879,451.

*To all whom it may concern:*

Be it known that I, WILLIAM O. STODDARD, Jr., a citizen of the United States, residing at Madison, county of Morris, and State of New Jersey, have invented a certain new and useful Material Adapted for Use in the Manufacture of an Imitation Leather, of which the following is a specification.

My invention relates to a material suitable for the manufacture of an imitation leather or as a substitute for leather, and to the method of making such material.

Generally stated the method consists in coating a suitable base, such as felt or a woven fabric with a composition which gives to the base a practically dry, hard surface, and then applying to such surface a finishing coat which will unite or weld with said surface on the application of heat, the finished product having a surface which is practically impervious to air and water, and one which is adapted for use in the arts in the manufacture of an imitation leather, or as a substitute for leather.

More specifically stated, the method consists in coating a fabric with a composition containing a nitrocellulose solution and a vegetable oil, then the application of a japanning composition containing a vegetable oil, a solvent, and a coloring matter, and finally subjecting the fabric so treated to a sufficient degree of heat to bake the japanning composition and to cause it to adhere firmly to the first coat. The two coats may be spread upon the fabric in any manner, and the exact ingredients and their proportions may be varied to meet the requirements of a material which is adapted to known methods of embossing to produce an imitation leather.

The following will serve as an example which has proved successful in practice. The fabric, used as a base, may be such as has heretofore been used in the making of an imitation or leather substitute. For such base I have used both felt and a woven fabric. The first coat, as above stated is a composition of a nitro-cellulose solution and a vegetable oil, and three applications of such composition are preferably made, the proportions of the ingredients varying as follows: For the first application I take substantially 100 pounds of a twelve ounce solution of nitrated cotton to which is added about fifty-six pounds of a vegetable oil, preferably rape seed oil, as with such oil I have secured better results than with any other. Castor oil, cotton seed oil and linseed oil may be used but the results are not as satisfactory as with rape seed oil. For the second application I use about 100 pounds of a twelve ounce solution of nitrated cotton and about twenty-eight pounds of the preferred vegetable oil. To this may be added about forty pounds of the solvent of the nitrated cotton. For the third application I use about 100 pounds of a twelve ounce solution of nitrated cotton and about eighteen pounds of the preferred vegetable oil. The nitrated cotton is dissolved in any well-known solvent, as amyl acetate or alcohol, and the vegetable oil added thereto. Each batch is thoroughly agitated to make a homogeneous composition, the first having a specific gravity of 17 Baumé at 60° Fahrenheit; the second a specific gravity of 25 Baumé at 60° Fahrenheit; and the third a specific gravity of 25 Baumé at 60° Fahrenheit. It will be noted that in the preferred proportions the amount of the vegetable oil in the first composition is such as will prevent it drying hard, and that the second composition contains substantially one-half of the amount of oil as the first, and that the third contains substantially one-third of the amount of oil as the first. These compositions are applied or spread upon the fabric cold, by any suitable means such as by a brush, or from a nozzle in front of which is a knife or spreader, the full width of the fabric, and which spreads the composition in a thin even film over the fabric. The fabric may be mounted upon a frame having rollers around which the fabric is run in the form of a continuous belt, means being provided to cause the fabric to travel at any desired speed, varying from ten feet to sixty feet per minute.

Each film of the composition as it is applied, may be dried in the open air or by any known drying process, and after the desired number of applications, preferably three, of the nitro-cellulose and vegetable oil composition have been made, the fabric is removed from the machine and hung up in ovens having a temperature of about 90° F.

in order that it may properly season. At the end of this part of the operation the fabric will have a practically dry, hard coating firmly adhering thereto.

To the fabric, treated as above, is then applied what is known in the art as a japanning composition comprising a vegetable oil, a mineral solvent, and a coloring matter. For such composition I have used boiled linseed oil, naphtha and an opaque pigment. The fabric is placed on a long table and the japanning composition properly applied thereto as for example, with large brushes. After the japanning composition has been applied the fabric is run into a large chamber where it is subjected to a dry heat of the usual japanning temperature of about 150° F. to 180° F. in order to thoroughly bake, and to unite, the japanning coat with the coat of nitrated cotton. During the baking operation the heat softens the nitrated cotton coat and there is effected a firm union between the nitrated cotton and japanning coats.

The product produced as above described is substantially devoid of the odor of the solvents and oils used; it is soft and pliable, and if a woven fabric is used as the base, the lines of the weave are practically eliminated.

The product obtained by the foregoing treatment may be sold as a commercial article for any use for which it is adapted. The particular use to which I have put it is for making an imitation leather, and for such purpose the only further treatment required is to emboss it by means of a die in the usual and well-known manner, which completes the process for plain colors, and then for Spanish or antique effects to pass it through the so-called blacking process consisting in coating the material lightly with a composition of vegetable oils and vegetable gums, coloring matter and a suitable solvent. This final coating being allowed to partly dry when it is wiped off, care being used to remove only the blacking from the prominent or high points of the embossing. This finishing process brings out the variegated or so-called Spanish and antique effects.

The union between the nitro-cellulose coat and the japanning coat is sufficiently firm to prevent separation between them when subjected to the die press for the purpose of embossing. This characteristic is one of extreme importance as it makes it possible to emboss a japanned surface on fabrics which, so far as known to me, has been impossible heretofore. Furthermore, the product, after embossing and blacking, is very pliable and may be bent without cracking and is well adapted for upholstery work.

Believing myself to be the first to coat a fabric with a composition containing nitrated cotton and an oil, and a superimposed finishing coat of a japanning composition baked thereon, I desire to claim the same broadly without reference to the particular ingredients of the composition.

In the specification and claims I have used the generic term "fabric" to mean felt or a woven fabric, or such material as has heretofore been used in the making of an imitation or leather substitute.

What I claim and desire to secure by Letters Patent of the United States is:—

1. A fabric having thereon a coating containing nitrated cotton and an oil, and a superimposed baked coating of a japanning composition.

2. A fabric having thereon a coating containing nitrated cotton and an oil, and a superimposed baked coating of a japanning composition united to the first coat.

3. A fabric having a coating containing nitrated cotton and a vegetable oil, and a superimposed coating of a japanning composition baked thereon.

4. A fabric having a coating containing nitrated cotton and rape seed oil, and a superimposed coating of a baked japanning composition.

5. A fabric having thereon a coating containing nitrated cotton and an oil, and a superimposed baked coating of a japanning composition sealing or binding the oil in the base or nitrated cotton coats.

6. A fabric having thereon a series of coats containing nitrated cotton and an oil, the ratio of oil to nitrated cotton varying in each coat, and a superimposed baked coating of a japanning composition.

7. A fabric having thereon a series of coats containing nitrated cotton and an oil, each successive coat containing less oil than the preceding coat or coats, and a superimposed baked coating of a japanning composition.

8. A fabric having thereon a series of coats containing nitrated cotton and rape seed oil, the ratio of oil to nitrated cotton varying in each coat, and a superimposed baked coating of a japanning composition.

9. A process consisting in applying to a fabric a nitro-cellulose composition containing a vegetable oil, then a sealing composition, and then subjecting the fabric so covered to a baking heat.

10. A process consisting in applying to a fabric a composition containing nitrated cotton and an oil, then a japanning composition, and then subjecting the fabric so treated to a baking heat.

11. A process consisting in applying to a fabric a composition containing nitrated cotton and a vegetable oil, then a japanning composition, and then subjecting the fabric so treated to a baking heat.

12. A process which consists in applying to a fabric a composition containing nitrated cotton and rape seed oil, then a japanning composition, and then subjecting the fabric so treated to a baking heat.

13. A process consisting in coating a fabric with successive compositions each containing nitrated cotton and a vegetable oil, and each successive coat containing less vegetable oil than the preceding coats, drying the fabric, and then applying a baked japanning coat for the purpose described.

14. A process consisting in coating a fabric with successive compositions each containing nitrated cotton and an oil, and varying the relative proportions of the nitrated cotton and oil in each coat, and then applying a japanning composition and baking the same thus effecting a welding or union between the nitrated cotton coats and the japanning coat.

15. A process consisting in coating a fabric with a composition containing nitrated cotton and a vegetable oil, and then applying a japanning composition and uniting the nitrated cotton coat with the japan coat by baking.

16. A process consisting in coating a fabric with a composition containing nitrated cotton and a vegetable oil, and then baking a japanning composition on the said nitrated cotton coating for the purpose of sealing in the oil in the said coating and thus preventing the oil from appearing on the surface of the finished goods.

17. A process consisting in coating a fabric with a composition containing nitrated cotton and an oil, and a superimposed baked japanning composition, the nitrated cotton and oil in the first coat or coats to be in such proportion that the oil will not be set free under the usual baking temperature.

18. A process consisting in coating a fabric with a composition containing nitrated cotton and rape seed oil, drying the fabric, then applying a japanning composition and uniting the same with the nitrated cotton coat by baking.

19. A process consisting in coating a fabric with a composition containing nitrated cotton and rape seed oil, each successive coat containing less oil than the preceding coat or coats, and a superimposed baked coating of a japanning composition.

In testimony whereof I have hereunto signed my name.

WILLIAM O. STODDARD, Jr.